(12) United States Patent
Moriwaki et al.

(10) Patent No.: US 6,893,714 B2
(45) Date of Patent: May 17, 2005

(54) MAGNETIC RECORDING MEDIUM

(75) Inventors: Kenichi Moriwaki, Odawara (JP); Kazuyuki Usuki, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 38 days.

(21) Appl. No.: 10/342,186

(22) Filed: Jan. 15, 2003

(65) Prior Publication Data

US 2004/0202843 A1 Oct. 14, 2004

(30) Foreign Application Priority Data

Jan. 15, 2002 (JP) ........................................ 2002-006102

(51) Int. Cl.[7] ............................. G11B 5/66; G11B 5/70
(52) U.S. Cl. ............. 428/332; 428/694 T; 428/694 TS; 428/694 TP; 428/694 TC; 428/694 SL; 428/900

(58) Field of Search ............................. 428/694 T, 336, 428/694 TS, 694 TP, 694 TC, 694 SL, 900, 332, 694 S

(56) References Cited

U.S. PATENT DOCUMENTS

| | | | | |
|---|---|---|---|---|
| 6,303,214 B1 | * | 10/2001 | Chour et al. | ................ 428/212 |
| 6,391,423 B1 | * | 5/2002 | Sato et al. | ................ 428/141 |
| 6,656,613 B2 | * | 12/2003 | Litvinov et al. | ..... 428/694 TM |
| 2003/0152809 A1 | * | 8/2003 | Oikawa et al. | ........ 428/694 TS |

* cited by examiner

Primary Examiner—Holly Rickman
(74) Attorney, Agent, or Firm—Sughrue Mion, PLLC

(57) ABSTRACT

The present invention provides a magnetic recording medium such as a flexible disk which is capable of high-density recording and is excellent in magnetic property. The magnetic recording medium comprises a magnetic layer, including a cobalt-containing ferromagnetic alloy and a non-magnetic material, on at least one surface of a non-magnetic substrate, wherein the ferromagnetic alloy forms a columnar structure.

31 Claims, 5 Drawing Sheets

40nm

MAGNETIC RECORDING MEDIUM

BACKGROUND OF THE INVENTION

The present invention relates to a magnetic recording medium and, more particularly, to a magnetic recording medium which is capable of high-density magnetic recording.

In recent years, with the spread of internet, a hard disk mounted on a personal computer tends to have a higher capacity for handling an increased amount of image information. For backing up a large amount of information stored in the hard disk or for allowing such information to be utilized by another computer, various removable recording media are used.

Flexible magnetic recording media such as a magnetic tape and a flexible disk have many advantages that recording and reading of information takes only a short time, that information can be recorded and read by using a small equipment, and the like. Therefore, the magnetic tape and the flexible disk are well used as typical removable-type recording media for backing up the data of a computer and for storing a large amount of data.

It is desired to provide a magnetic recording medium enabling storage of a large amount of data with a smaller number of magnetic tapes or flexible disks and it is desired to further improve the recording density.

The magnetic recording media using a flexible polymer body such as a flexible disk are categorized into an application type and a deposition type. The application type is a type in which magnetic fine particles containing a metal such as iron, chrome, and cobalt are dispersed into a polymer binder and is applied to a substrate. The deposition type is a type in which a cobalt alloy is deposited to form a film in a vacuum environment.

The deposition type magnetic recording medium has a higher recording density than that of the application type magnetic recording medium. However, a magnetic layer used in the flexible magnetic recording medium is a metallic thin film formed by deposition and has a problem of a larger noise than a ferromagnetic thin film to be used in a hard disk which is made of cobalt alloy by sputtering. Accordingly, with a high density recording head using magnetoresistive elements, the magnetic layer can not provide sufficient magneto-electric transform characteristic and is therefore not suited for high recording density performance.

Several attempts have been reported for providing a flexible disk having a ferromagnetic metallic thin-film which is formed by sputtering similarly to the hard disk. However, nothing is in practical use.

In the process of manufacturing the hard disk, a substrate is heated to nearly 200° C. during the sputtering. If the same process is adopted to manufacture the flexible disk, the substrate has poor heat resistance and is thus deformed because the substrate of the flexible disk is generally made of polyethylene terephthalate or polyethylene naphthalate. Even when aromatic polyamide film having excellent heat resistance is used, it is difficult to make a flexible disk with less deformation because the aromatic polyamide film is susceptible to dimensional changes such as thermal expansion, thermal contraction, and humidity expansion.

As a magnetic layer for a hard disk, a ferromagnetic metallic thin film made of a mixture of a cobalt-containing ferromagnetic alloy and a non-magnetic metal oxide has been proposed in JP0573880A and JP07311929A.

The magnetic layer disclosed in JP0573880A and JP07311929A has so-called granular structure in which magnetic particles are dispersed by non-magnetic compound in the magnetic layer. When granular magnetic substance is dispersed in the non-magnetic compound, it is difficult to even the dispersion in size of magnetic particles. When used as a magnetic recording medium, therefore, it has a problem of large noise. Since the magnetic substance is granular, the magnetic substance is susceptible to non-magnetic compound existing around it, has poor structural stability, and hardly applies magnetic anisotropic. Therefore, it is difficult to achieve high coercive force and high output with such a magnetic layer. It is therefore desired to provide magnetic layer which has high structural stability and can resolve the noise problem.

BRIEF DESCRIPTION OF THE DRAWINGS

The patent or application file contains two drawings executed in color. Copies of this patent or patent application publication with color drawings will be provided by the U.S. Patent and Trademark Office upon request and payment of the necessary fee.

SUMMERY OF THE INVENTION

1. A magnetic recording medium comprises a magnetic layer, including a cobalt-containing ferromagnetic alloy and a non-magnetic material, on at least one surface of a non-magnetic substrate, and is characterized in that the ferromagnetic alloy forms a columnar structure.

2. In the magnetic recording medium, the non-magnetic substrate is a flexible polymer body.

DESCRIPTION OF THE PREFERRED EMBODIMENTS

The basic principle of a magnetic recording medium of the present invention is a magnetic recording medium comprising a magnetic layer, composed of a cobalt-containing ferromagnetic alloy and a non-magnetic material, on at least one surface of a non-magnetic body. The ferromagnetic alloy forms a columnar structure, whereby the ferromagnetic alloy has improved structural stability in the magnetic layer composed of a ferromagnetic alloy and a non-magnetic material so that the high coercive force is achieved and magnetic particles can be uniformed in size and dispersion, thereby achieving a low-noise magnetic recording medium.

In addition, the magnetic layer composed of the ferromagnetic alloy and the non-magnetic material in the columnar structure can be formed by sputtering at a room temperature without heating. Therefore, even when a flexible polymer body which may be deformed when heated at a high temperature is used as the substrate, a magnetic recording medium having excellent property can be manufactured.

By using a ferromagnetic metal thin film layer composed of the cobalt-containing ferromagnetic alloy and the non-magnetic material as the magnetic layer, the obtained magnetic recording medium has high recording density just like a hard disk. Therefore, increase in capacity of removable-type magnetic recording media can be achieved.

Further, by using such a ferromagnetic metal thin film, the formation of a magnetic layer can be achieved without heating the substrate. Therefore, even when the substrate temperature is equal to the room temperature, the magnetic recording medium has excellent magnetic property. That is, even with a flexible body such as synthetic resin film as well as a glass substrate and an aluminum substrate, a magnetic layer can be formed without being damaged by heat. Accordingly, the manufacture of flat flexible disks can be realized.

Hereinafter, the present invention will be described with reference to the attached drawings.

Figure 1:
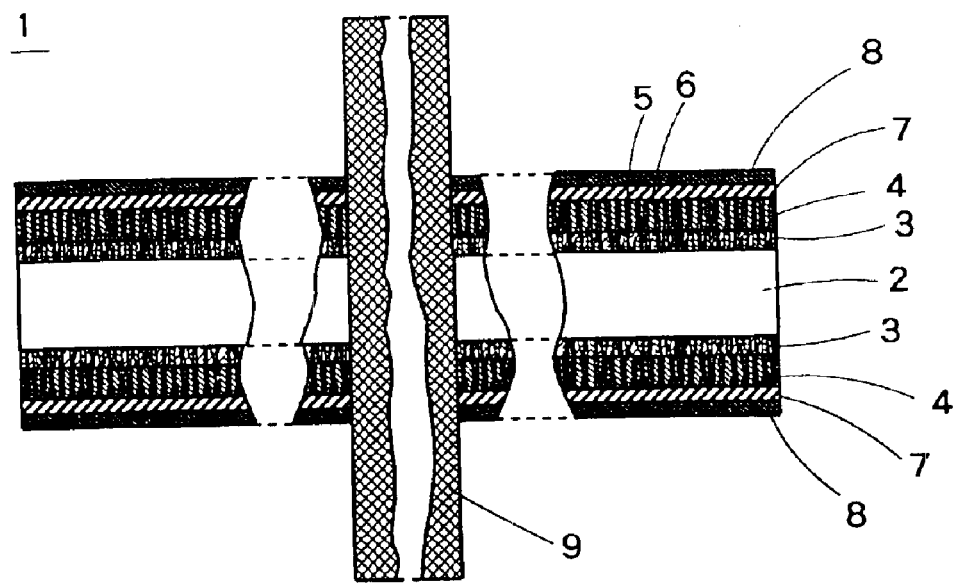
FIG. 1 is an illustration for explaining an embodiment of a magnetic recording medium according to the present invention.

FIG. 1 is an illustration for explaining an embodiment of a magnetic recording medium according to the present invention and showing a section of a flexible disk without a cartridge.

A flexible disk 1 has a flexible polymer body 2, foundation layers 3 on both surfaces of the flexible polymer body 2, and magnetic layers 4 formed on the foundation layers 3. Each magnetic layer 4 consists of a ferromagnetic alloy 5 and a nonmagnetic material 6 on each foundation layer 3. The ferromagnetic alloy has a columnar structure. Formed on each magnetic layer 4 is a protective layer 7 for protecting the magnetic layer 4 from degradation due to oxidization and from abrasion due to collision with a head or a sliding member. Formed on each protective layer 7 is a lubricant layer 8 for improving the running durability and the corrosion resistance. In addition, an engaging means 9 for loading the flexible disk 1 into a flexible disk drive is provided at the center of the flexible disk 1.

For use, the flexible disk of the present invention is placed in a cartridge, made of synthetic resin or the like and having a window for allowing access of a magnetic head when loaded into a device.

The magnetic recording medium of the present invention comprises a disk-shaped body made of a flexible synthetic resin film and magnetic layers, consisting of a ferromagnetic alloy containing at least cobalt and a non-magnetic material, which are formed on both surfaces of the body, respectively. The magnetic recording medium preferably further comprises base coat layers for improving the surface characteristics of the flexible synthetic resin film of the property of blocking air from the side of the flexible synthetic resin film, foundation layers controlling the crystalline structure of the magnetic layers, protective layers for protecting the magnetic layers from corrosion and abrasion, and lubricant layers for improving the running durability and the corrosion resistance, these layers being laminated in this order.

The magnetic layer may be a so-called perpendicular magnetic recording film having axis of easy magnetization which is perpendicular to the surface of the flexible disk or an in-plane magnetic recording film having axis of easy magnetization which is parallel to the surface of the flexible disk. The orientation of the axis of easy magnetization can be controlled according to the material and the crystalline structure of the foundation layer and the composition and the filming condition of the magnetic film.

Figure 2:
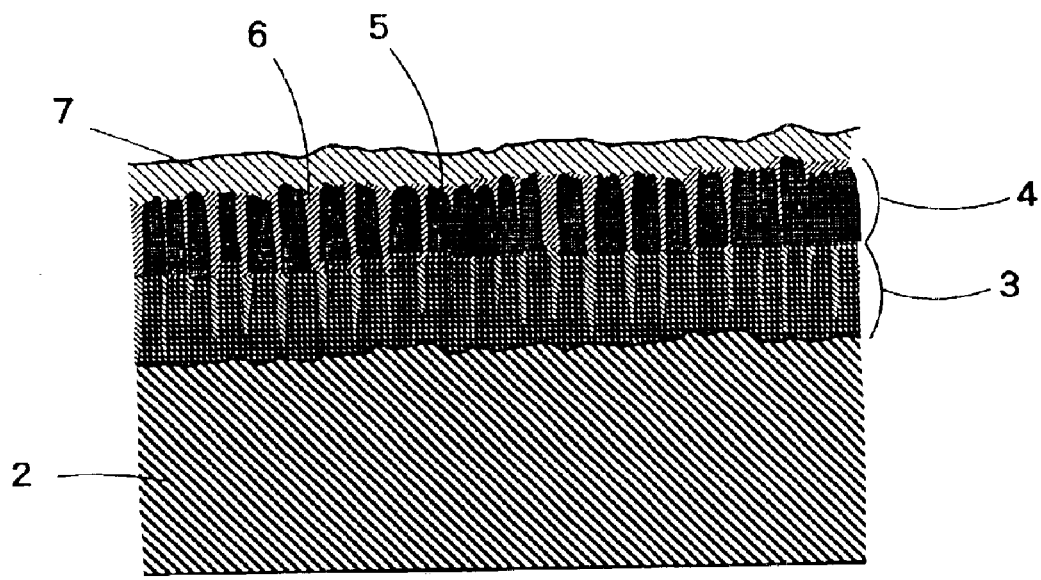
FIG. 2 is a sectional view for explaining a magnetic layer of the present invention.

FIG. 2 is a sectional view for explaining the magnetic layer of the present invention.

FIG. 2 shows a non-magnetic body made of a flexible polymer body 2, a foundation layer 3 formed on the flexible polymer body 2, and a magnetic layer 4 formed on the foundation layer 3. The magnetic layer 4 consists of a ferromagnetic alloy 5 containing at least cobalt and a non-magnetic material 6. The ferromagnetic alloy 5 designates portions containing a larger amount of ferromagnetic alloy in comparison with the whole. The non-magnetic material 6 designates portions containing a larger amount of non-magnetic material in comparison with the whole. The portions containing a larger amount of the ferromagnetic alloy are formed at intervals from 0.01 nm to 10 nm.

Especially, the magnetic layer 4 of the present invention is formed on the foundation layer 3 by crystal growth and forms a columnar structure. Since the ferromagnetic alloy forms the columnar structure, the separation between the portions containing a larger amount of ferromagnetic alloy is stable because of existence of the portions containing a larger amount of non-magnetic material, thereby achieving higher coercive force. The portion containing a larger amount of ferromagnetic alloy has increased intensity of magnetization, thereby achieving higher output. In addition, magnetic particles in the portions containing a larger amount of ferromagnetic alloy can be uniformed in size and dispersion, thereby realizing low-noise magnetic recording media.

The columnar structure of the ferromagnetic alloy will be described. The foundation layer which is previously formed before the ferromagnetic alloy layer is formed has the columnar structure. The magnetic layer is formed by the epitaxial crystal growth on the columnar structure of the foundation layer. This structure provides significantly improved structural stability as compared to the granular structure in which particles as the magnetic substances are dispersed in the non-magnetic compound.

The diameter of each column is in a range from 0.01 nm to 20 nm. The cobalt content of the portion containing a larger amount of ferromagnetic alloy is larger than that of the portion containing a larger amount of non-magnetic material by 2 atomic % to 30 atomic %. On the other hand, the non-magnetic material content of the portion containing a larger amount of non-magnetic material is larger than that of the portion containing a larger amount of ferromagnetic alloy by 2 atomic % to 50 atomic %.

The structure of the magnetic layer of the present invention can be observed by a transmission electron microscope. By analyzing the respective areas, the compositions can be checked.

In the present invention, when a foundation layer which is unsuitable for controlling the orientation of crystallization of the magnetic layer is employed or when the content of non-magnetic material in the magnetic layer is larger, it is difficult to built the columnar structure of the magnetic substance, thus increasing the interaction between the magnetic substances or allowing the magnetic substances to be granular forms in the non-magnetic material. Accordingly, the coercive force is reduced and the noise generated from the magnetic recording medium is increased.

Examples of the ferromagnetic alloy containing cobalt which can be employed in the present invention include alloys of cobalt and any of a group consisting of chrome, platinum, nickel, iron, boron, silicon, tantalum, niobium, and the like. In terms of the recording performance, Co—Pt—Cr, Co—Pt—Cr—Ta, and Co—Pt—Cr—B are especially preferable.

The non-magnetic material may be oxide, nitride, or carbide of the following elements: Si, Zr, Ta, B, Ti, Al, Cr, Ba, Zn, Na, La, In, and Pb. In terms of the recording performance, the oxide of silicon is most preferred.

The mixing ratio between the cobalt-containing ferromagnetic alloy and the non-magnetic material is preferably in a range from 95:5 to 80:20 (by atomic ratio), more preferably from 90:10 to 85:15 (Ferromagnetic alloy:Non-magnetic material). When the ferromagnetic alloy content is greater than this range, the segregation between the columnar magnetic substances becomes insufficient, thereby reducing coercive force. On the other hand, when the ferromagnetic alloy content is smaller than this range, the magnetization is reduced, thus significantly reducing the single output.

The thickness of the magnetic layer made of a mixture of the cobalt-containing ferromagnetic alloy and the non-magnetic material is preferably in a range from 10 nm to 60 nm, more preferably in a range from 20 nm to 40 nm. The thickness larger than this range significantly increases the noise. On the other hand, the thickness smaller than this range significantly reduces the output.

The magnetic layer made of a mixture of the cobalt-containing ferromagnetic alloy and the non-magnetic material can be formed by a method forming a film in vacuum environment such as vacuum deposition and sputtering. Among the methods, the sputtering is suitable for the present invention because the sputtering enables the easy formation of a high-quality super-thin film. As the sputtering method, either of DC sputtering and RF sputtering may be employed.

For forming a magnetic layer on the flexible body, a web sputtering equipment may be suitably used, which continuously fabricates films on band-like flexible body films. A sheet-type sputtering equipment and a pass-type sputtering equipment which are usually used for fabricating film on an aluminum substrate or a glass substrate may be employed.

As sputtering gas to be used for the sputtering, Argon gas may be used. However, another noble gas may be used. A small amount of oxygen or nitrogen gas may be introduced for the purpose of adjusting the oxygen content and the nitrogen content in the non-magnetic material and/or the purpose of oxidizing or nitriding the surface.

For forming the magnetic layer made of a cobalt-containing ferromagnetic alloy and a non-magnetic material by the sputtering according to the present invention, two targets, i.e. a ferromagnetic alloy target and a non-magnetic material target may be used and a co-sputtering method may be employed. Alternatively, by using a mixture target in which a ferromagnetic alloy and a non-magnetic material are uniformly mixed to have a composition rate equal to that of the ferromagnetic alloy and the non-magnetic material of the layer to be formed, a magnetic layer in which the ferromagnetic alloy is uniformly dispersed can be formed. The mixture target may be prepared by hot pressing or the like.

It is preferable to form the foundation layer prior to the formation of the magnetic layer. The formation of the foundation layer allows the improvement of adhesion, the reduction in membrane stress, and the control of the orientation of crystallization, thereby enabling the formation of a magnetic layer having more stable columnar structure.

Preferable foundation layer according to the present invention is made of at least one selected from a group consisting of Li, Be, Mg, Al, Si, P, S, K, Ca, Sc, Ti, V, Mn, Fe, Co, Ni, Cu, Zn, Ga, Ge, As, Se, Rb, Sr, Y, Zr, Nb, Mo, Ru, Rh, Pd, Ag, In, Sn, Sb, Te, Cs, Ba, Hf, Ta, W, Re, Os, Ir, Pt, Au, Pb, and Bi.

Especially, a chrome-containing alloy containing at least one selected from a group consisting of Co, Be, Os, Re, Ti, Zn, Ta, Al, Mo, W, V, Fe, Sb, Ir, Ru, Rh, Pt, Pd, Si, and Zr is preferably employed. In terms of control of lattice constant and improvement of adhesion, it is preferable to employ Ti, Be, Ru, Si, or Zr.

By using the aforementioned foundation layer, the formation of columnar structure of the ferromagnetic alloy is improved, thus improving the recording property.

The thickness of the foundation layer is preferably from 10 nm to 200 nm, more preferably from 10 nm to 100 nm. Thickness greater than 200 nm wanes the productivity and also increase the membrane stress. Thickness less than 10 nm avoids the effect of the foundation layer for improving the magnetic property.

The foundation layer can be formed by a method forming a film in vacuum environment such as vacuum deposition and sputtering. Among the methods, the sputtering is suitable for the present invention because the sputtering enables the easy formation of a high-quality super-thin film. As the sputtering, either of DC sputtering and RF sputtering may be employed. In case of a flexible disk using a flexible polymer film as the body, a web sputtering equipment may be suitably used, which continuously fabricates films on band-like continuous bodies. A sheet-type sputtering equipment and a pass-type sputtering equipment which are usually used for fabricating film on an aluminum substrate or a glass substrate may be employed.

As sputtering gas to be used for the sputtering of the foundation layer, Argon gas may be used. However, another noble gas may be used. A small amount of oxygen or nitrogen gas may be introduced for the purpose of controlling the lattice constant and reducing the membrane stress of the foundation layer.

For forming the foundation layer made of a desired component by the sputtering, a plurality of targets may be used and a co-sputtering method may be employed. However, for precisely controlling the lattice constant and making the obtained film uniform, it is preferable to use an alloy target made of an alloy containing the desired component. The alloy target may be prepared by hot pressing.

Preferable body for use in the magnetic recording medium of the present invention may be a flexible polymer body made of a synthetic resin film which can absorb impact when the magnetic head and the magnetic disk collide with each other. Examples of the synthetic resin film are films made of aromatic polyimide, aromatic polyamide, aromatic polyamide-imide, polyether ketone, polyether sulfone, polyether-imide, polysulfone, poly phenylene sulfide, polyethylene naphthalate, polyethylene terephthalate, polycarbonate, triacetate cellulose, fluorocarbon resin, or the like. Among these, polyethylene terephthalate and polyethylene naphthalate are especially preferable for the present invention because these have good surface property, are easily-available, and achieve good recording property without heating the substrate.

A body which is formed by laminating a plurality of synthetic resin films may be employed as the body. Use of such a laminate body reduces warps and waves caused by the body itself, thereby stabilizing the contact between the magnetic recording media and the magnetic head and thus significantly improving the scratch resistance of the magnetic recording layer.

The laminate body may made by a method such as roll lamination by means of a heat roller, lamination by means of flat heat presses, dry lamination by applying adhesive agent on a surface to be bonded, and a method of using adhesive sheets formed in sheet-like forms. Used as the adhesive agent for bonding the laminate body may be hot-melt adhesive, thermosetting adhesive, UV cure adhesive, electron cure adhesive, pressure-sensitive adhesive sheets, and anaerobic adhesive.

The thickness of the body is from 10 $\mu$m to 200 $\mu$m, preferably from 20 $\mu$m to 150 $\mu$m, more preferably from 30 $\mu$m to 100 $\mu$m. With a body less than 10 $\mu$m in thickness, the stability of the body during high-speed rotation is impaired, thus increasing the side-runout. On the other hand, with a body more than 200 $\mu$m in thickness, the rigidity of the body during rotation is increased so that it is difficult to avoid the impact during a collision, thus causing the jump of the magnetic head. It is therefore undesirable.

The nerve of the flexible polymer body is represented by the following equation:

$$\text{Nerve of Flexible Polymer Body} = Ebd^3/12$$

When b=10 mm in this equation, the obtained value is preferably in a range from 4.9 MPa to 19.6 MPa (0.5 kgf/mm$^2$ to 2.0 kgf/mm$^2$), more preferably in a range from 6.9 MPa to 14.7 MPa (0.7 kgf/mm$^2$ to 1.5 kgf/mm$^2$)

In the above equation, "E" represents Young's modulus, "b" represents the width of film, and "d" represents the thickness of film.

The flexible polymer body preferably has a surface as flat and smooth as possible for enabling the recording with the magnetic head. Irregularities of the body surface significantly impair the property of reproducing signals. Specifically, in case of using an undercoat layer as will be described below, the surface roughness measured by a spectra surface roughness tester is 5 nm or less, preferably 2 nm or less, at the center surface mean roughness SRa, and the height of protrusions measured by a tracer-type roughness gauge of is 1 $\mu$m or less, preferably 0.1 $\mu$m or less. On the other hand, in case of no undercoat layer, the surface roughness measured by the spectra surface roughness tester is 3 nm or less, preferably 1 nm or less, at the center surface mean roughness SRa, and the height of protrusions measured by a tracer-type roughness gauge is 0.1 $\mu$m or less, preferably 0.06 $\mu$m or less.

It is preferable to provide an undercoat layer on the surface of the flexible polymer body for improving the planarity and increasing the gas barrier property. Since the magnetic layer is formed by sputtering or the like, the undercoat layer preferably has high heat resistance. Examples of material to be used for the undercoat layer include polyimide resin, polyamide-imide resin, silicone resin, and fluorocarbon resin. Among these, thermosetting polyimide resin, thermosetting silicone resin are especially preferable because these are well effective in smoothing the surface. The thickness of the undercoat layer is preferably from 0.1 $\mu$m to 3.0 $\mu$m. In case of laminating other resin films on the body, the undercoat layer may be formed before the lamination process or may be formed after the lamination process.

As the thermosetting polyimide resin, polyimide resin obtained by thermal polymerization of an imide monomer having at least two terminal unsaturated groups within a molecule, for example, bisallylunadiimide ("BANI" available from Maruzen Petrochemical Co., Ltd.) is suitably used. The imide monomer can be thermally polymerized at a relatively low temperature after applied to the surface of the body in the state of a monomer, thereby allowing the monomer as the raw material to be directly applied to the body and then to be cured. In addition, the imide monomer can be used in the state solved by a commonly used organic solvent, is excellent in productivity and workability, and has low molecular weight and low solution viscosity so that the imide monomer can spread fast over the uneven surface. Therefore, the imide monomer is well effective in smoothing the surface.

Suitably used as the thermosetting silicone resin is a silicone resin in which a silicon compound into which an organic group is introduced is used as raw material and polymerized by the sol-gel process. The silicone resin has a structure in which an organic group is substituted for a part of silicon dioxide bond, and is more excellent in heat resistance than silicone rubber and is also more excellent in flexibility than a silicon dioxide film. Therefore, when a resin film is formed on the body composed of a flexible film, it is hard to cause crack or peeling. Further, the monomer as the raw material can be directly applied to the flexible polymer body and then cured. Therefore, a commonly used solvent can be used for solving the silicone resin so that the silicone resin can spread fast over the uneven surface, that is, the silicone resin is well effective in smoothing the surface. Moreover, condensation polymerization reaction progresses from a relatively low temperature for addition of catalyst such as acid or chelating agent. As a result, the resin can be cured in a short time and a resin film can be formed using a general purpose coating device. Moreover, the thermosetting silicone resin is excellent in gas barrier property, thereby providing high gas barrier ratio for blocking gas which is produced from the flexible polymer body during the formation of the magnetic layer and should impair the crystallization and the orientation of the magnetic layer or the foundation layer. Therefore, the thermosetting silicone resin is especially suitable.

Minute protrusions (textures) are preferably formed on the surface of the undercoat layer for the purposes of reducing a true contact area between the magnetic head and the flexible disk and improving the sliding property. Further, the minute protrusions advantageously improve the handling characteristics of the flexible polymer body. The method for forming minute protrusions may be a method for applying spherical silica particles and a method for forming protrusions of organic substance by applying an emulsion. Particularly, the method for forming minute protrusions by applying spherical silica particles is preferably used for the purpose of maintaining heat resistance of the undercoat layer.

The height of the minute protrusions is preferably in a range from 5 nm to 60 nm, and more preferably from 10 nm to 30 nm. With minute protrusions which are too high, the property of recording and reproducing signals is impaired due to spacing loss between the recording/reproducing head and the medium. Further, with minute protrusions which are too low, an effect of improvement in sliding property decreases. The density of the minute protrusions is preferably in a range from 0. 1to 100/$\mu$m$^2$, and more preferably in a range from 1 to 10/$\mu$m$^2$. If the density of the minute protrusions is too low, an effect of improvement in sliding property decreases. If the density of the minute protrusions is too high, an increase of agglomerated particles causes a large number of high protrusions, thus impairing the recording and reproducing characteristics.

Further, the minute protrusions may be fixed to the surface of the body by using a binder. The binder preferably includes resin having sufficient heat resistance. Preferably used as the resin having heat resistance are solvent soluble polyimide resin, thermosetting polyimide resin, and thermosetting silicone resin.

A seed layer is preferably provided between the foundation layer and the non-magnetic body for the purpose of increasing the adhesiveness and improving the orientation of crystallization. Examples of the material of the seed layer include Ta, Ta—Si, Ta—Al, Ta—C, Ta—W, Ta—Ti, Ta—N, Ta—Ni, Ta—O, Ta—P, Ni—P, Ni—Al, Ni—C, Ni—Ti, Ni—W, Ni—Si, Ni—N, Ni—O, Ti—W, Ti—C, Ti—N, Ti—Si, Ti—O, Ti—P, Al—Ti, Mg—O, Mg—W, Mg—C, Mg—N, Mg—Ti, Mg—Ni, Mg—Al, Mg—Si, Mg—P, Zn—Si, Zn—Al, Zn—C, Zn—W, Zn—Ti, Zn—N, Zn—Ni, Zn—O, and Zn—P. Among them, Ta, Ta—Si, Ta—C, Ni—P, Ni—Al, Ti—W, Ti—C, Mg—O, and Zn—Si are particularly suitable in terms of increase in the adhesiveness and improvement of the orientation of crystallization.

The seed layer can be formed by a method forming a film in vacuum environment such as vacuum deposition and sputtering. Among the methods, the sputtering is especially suitable because the sputtering enables the easy formation of a high-quality super-thin film.

A protective layer is formed on the magnetic layer. The protective layer is provided for the purpose of preventing corrosion of metal material contained in the magnetic recording layer and preventing abrasion caused by poor contact or contact sliding between the magnetic head and the magnetic disk, thereby improving running durability and corrosion resistance. The protective layer can be formed by using silica, alumina, titania, zirconia, oxide such as cobalt oxide and nickel oxide, nitride such as titanium nitride, silicon nitride and boron nitride, carbide such as silicon carbide, chromium carbide and boron carbide, or carbon such as graphite and amorphous carbon.

The protective layer is a hard film of which hardness is equal to or greater than that of the material of the magnetic head, and also preferably has an effect of hardly causing seizing during sliding movement and maintains the effect from the standpoint of excellent sliding durability. Moreover, the protective layer more preferably has a smaller number of pinholes formed therein from the standpoint of excellent corrosion resistance. An example of such protective layer is a hard carbon film which is called diamond-like carbon (DLC) produced by CVD method.

The protective layer may be a lamination of thin films of two or more kinds having different properties. For example, a hard carbon protective layer may be provided on the surface side for improving the sliding property and a nitride protective layer made of silicon nitride may be provided on the magnetic recording layer side for improving the corrosion resistance. In this case, coexistence between the corrosion resistance and the durability can be achieved in a higher order.

A lubricating layer is formed on the protective layer for the purpose of improving running durability and corrosion resistance. A lubricating agent such as hydrocarbon based lubricating agent, fluorine based lubricating agent or extreme-pressure additive is used for the lubricating layer.

Examples of the hydrocarbon based lubricating agent include carboxylic acids such as stearic acid and oleic acid, esters such as butyl stearate, sulfonic acids such as octadecyl sulfonic acid, phosphoric esters such as monooctadecyl phosphate, alcohols such as stearyl alcohol and oleyl alcohol, carboxylic acid amides such as amide stearate, and amines such as stearyl amine.

Examples of the fluorine based lubricating agent include a lubricating agent obtained by substituting a fluoroalkyl group or perfluoropolyether group for all or a part of the alkyl group of the aforementioned hydrocarbon based lubricating agent. Examples of perfluoropolyether group include perfluoromethyleneoxide polymer, perfluoroethyleneoxide polymer, perfluoro-n-propyleneoxide polymer $(CF_2CF_2CF_2O)_n$, perfluoroisopropyleneoxide polymer $(CF(CF_3)CF_2O)_n$, or copolymers thereof. Specifically, perfluoromethylene-perfluoroethylene copolymer having a hydroxyl group at molecular weight end (trade name "FOMBLIN Z-DOL" manufactured by Audimont Inc.) is used.

Examples of extreme-pressure additive include phosphoric esters such as trilauryl phosphate, phosphorous acid esters such as trilauryl phosphite, thiophosphorous acid esters such as trilauryl trithiophosphite, thiophosphoric esters, and sulfur based extreme-pressure agents such as dibenzyl disulfide.

The aforementioned lubricating agent may be used singly or in a combination thereof. A solution with the lubricating agent dissolved in an organic solvent is applied onto the surface of the protective layer by spin coating, wire bar coating, gravure coating or dip coating, or is deposited to the surface of the protective layer by vacuum deposition. The amount of the lubricating agent to be applied is preferably in a range from 1 to 30 mg/m$^2$, and particularly preferably in a range from 2 to 20 mg/m$^2$.

Further, a rust preventive agent is preferably used for the purpose of further improving corrosion resistance. Examples of the rust preventive agent include nitrogen-containing heterocyclic rings such as benzotriazole, benzimidazole, purine, and pyrimidine, and derivatives with alkyl side chains introduced into mother nuclei of the heterocyclic rings, nitrogen- and sulfur-containing heterocyclic rings such as benzothiazole, 2-mercaptobenzothiazole, tetrazaindene ring compound and thiouracil compound, and derivatives thereof. These rust preventive agents each may be applied onto the protective layer in the state of being mixed with the lubricating agent, or may be applied onto the protective layer and thereafter coated with the lubricating agent thereon. The amount of the rust preventive agent to be applied is preferably in a range from 0.1 to 10 mg/m$^2$, and particularly preferably in a range from 0.5 to 5 mg/m$^2$.

The method of preparing a magnetic recording medium using the flexible polymer body will be described below.

Figure 3:
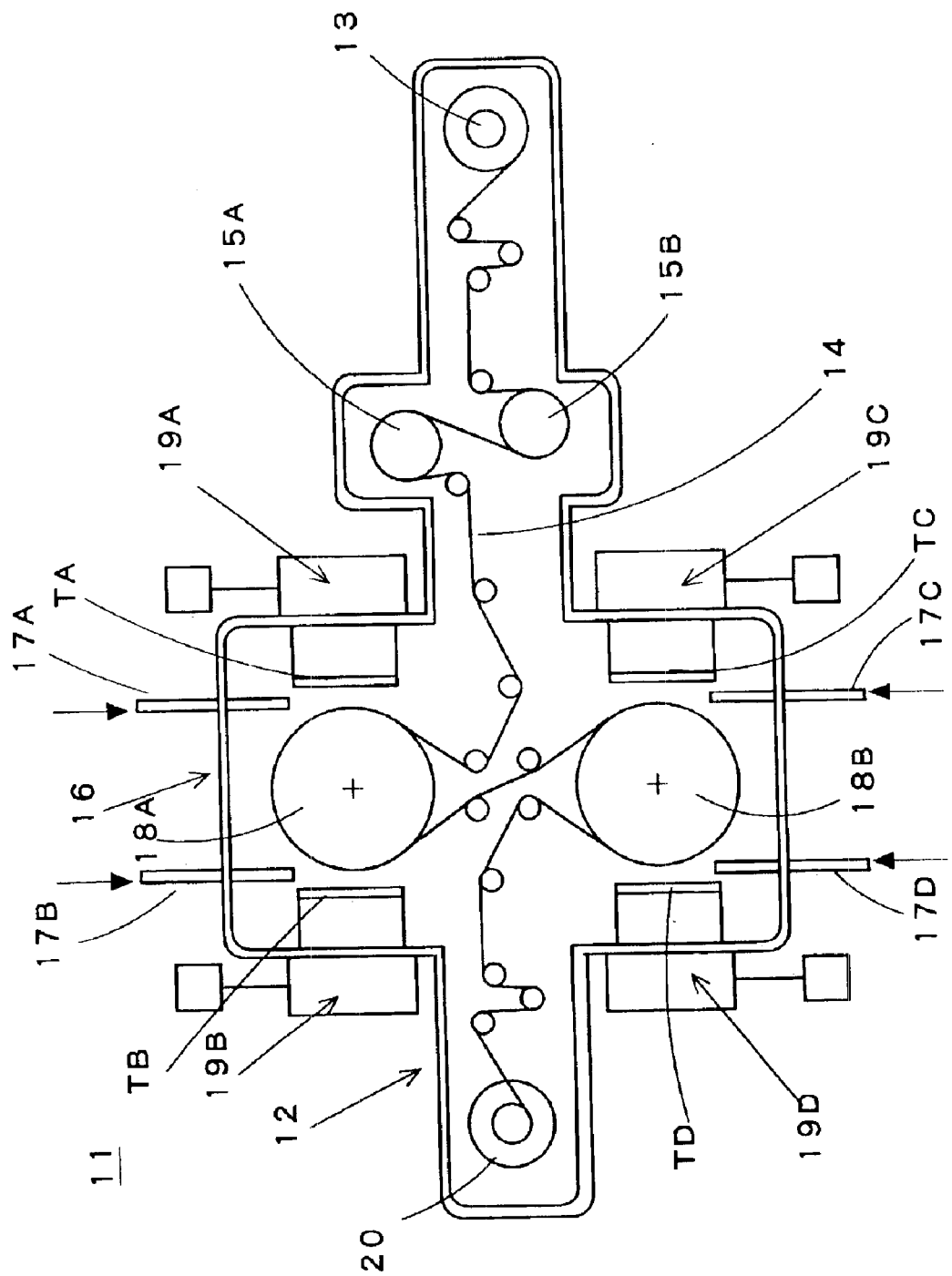
FIG. 3 is an illustration for explaining the method of forming magnetic layers onto a flexible polymer body.

FIG. 3 is an illustration for explaining the method of forming magnetic layers onto the flexible polymer body.

A deposition apparatus 11 comprises a vacuum chamber 12. A flexible polymer body 14 being withdrawn out of an unwinding roller 13 is sent to a deposition chamber 16 while the tension of the flexible polymer body 14 is controlled by a pair of tension regulating rollers 15A, 15B.

The deposition chamber 16 is held in a hypobaric state at a predetermined vacuum by a vacuum pump. In this state, argon is supplied in a predetermined amount through gas supply pipes 17A through 17D. The flexible polymer body 14 is wrapped around and thus carried by a deposition roller 18A located within the deposition chamber 16. During this, atoms for forming foundation layer are struck out from a target TA of a foundation layer sputtering device 19A, thereby forming a layer on the flexible polymer body.

Then, at the deposition roller 18A, atoms for forming magnetic layer are struck out from a target TB attached to a magnetic layer sputtering device 19B onto the formed foundation layer, thereby forming a magnetic layer on the foundation layer. The target TB consists of ferromagnetic alloy and non-magnetic material which are uniformly dispersed.

In the next place, the flexible polymer body 14 with the magnetic layer is wrapped around and thus carried by a deposition roller 18B. During this, atoms for forming foundation layer are struck out from a target TC of a foundation layer sputtering device 19C, thereby forming a layer on a surface opposite to the surface on which the magnetic layer already has been formed of the flexible polymer body. Further, at the deposition roller 18B, atoms for forming magnetic layer are struck out from a target TD attached to a magnetic layer sputtering device 19D onto the formed foundation layer, thereby forming a magnetic layer on the foundation layer. The target TD consists of ferromagnetic alloy and non-magnetic material which are uniformly dispersed.

After the magnetic layers are formed on both surfaces of the flexible polymer body by the aforementioned steps, the flexible polymer body is wound up by a winding roller 20.

Though the above description has been made for the method for forming magnetic layers on both surfaces of the flexible polymer body, a magnetic layer may be formed on only one surface of the flexible polymer body according to the same method.

After the formation of the magnetic layer, protective layers such as a protective layer of a diamond-like carbon structure are formed on the magnetic layers by the CVD method.

Figure 4:
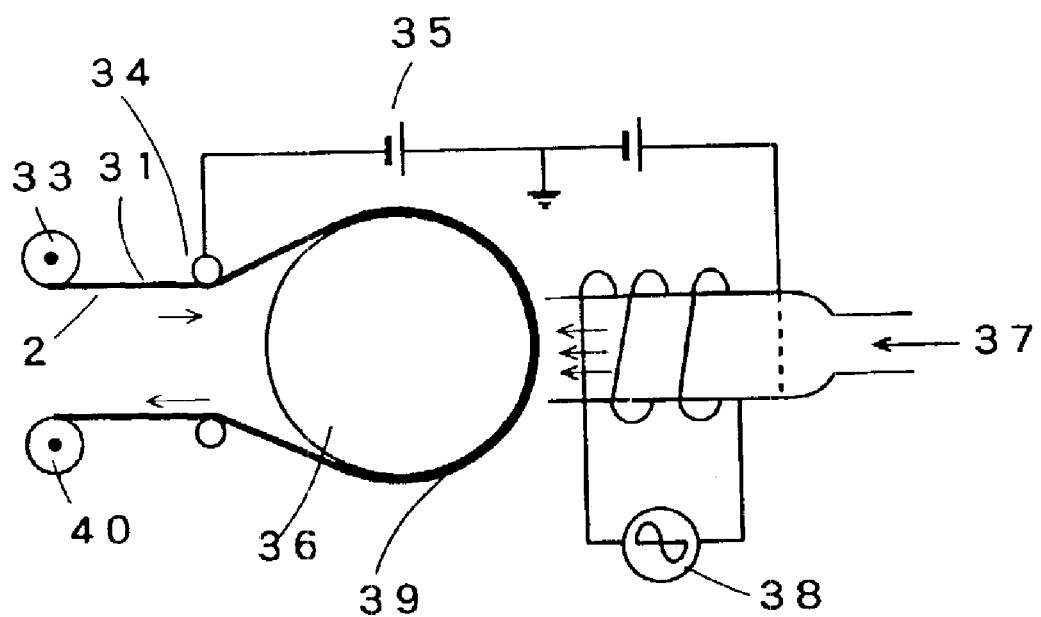
FIG. 4 is an illustration for explaining an example of a CVD apparatus utilizing high-frequency plasma which can be adopted to the present invention.

FIG. 4 is an illustration for explaining an example of a CVD apparatus utilizing high-frequency plasma which can be adopted to the present invention.

The flexible polymer body 32 formed with a magnetic layer 31 is withdrawn out of a roller 33. A bias voltage is applied from a bias supply 35 to the magnetic layer 31 via a pass roller 34. Then, the flexible polymer body 32 is wound around and carried by a deposition roller 36.

On the other hand, gaseous raw material 37 containing hydrocarbon, nitrogen, noble gas and the like forms a carbon protective layer 39 containing nitrogen and noble gas on the metal thin film on the flexible polymer body 32 wound around the deposition roller 36 by means of plasma produced by voltage applied from the high-frequency power supply 38. After that, the flexible polymer body is wound around a winding roller 40. The surface of the magnetic layer may be cleaned by a glow treatment using noble gas or hydrogen gas before the formation of the carbon protective layer, thereby ensuring increased adhesiveness. In addition, a silicon intermediate layer may be formed on the surface of the magnetic layer, thereby further increasing the adhesiveness.

Hereinafter, the present invention will be described with reference to examples and comparative examples.

EXAMPLE 1

A polyethylene naphthalate film of 63 $\mu$m in thickness and 1.4 nm in surface roughness Ra was prepared. An undercoat solution consisting of 3-glycidoxypropyltrimethoxysilane, phenyltriethoxysilane, hydrochloric acid, aluminum acetyl acetonate, and ethanol was applied to the polyethylene naphthalate film by gravure coating and was then dried and cured at 100° C. so as to form an undercoat layer made of silicone resin having a thickness of 1.0 $\mu$m. A coating solution which was prepared by mixing silica sol of 25 nm in particle diameter with the aforementioned undercoat solution was applied to the undercoat layer, thereby forming protrusions of 15 nm in height on the undercoat layer at a density of 10/$\mu m^2$. The undercoat layers were formed on both surfaces of the flexible polymer body film.

Next, the obtained whole film is attached to a web sputtering apparatus as shown in FIG. 3. The film is appressed to a deposition roller being cooled with water and thus carried by the deposition roller. During this, a seed layer of tantalum was formed on the undercoat layer by DC magnetron sputtering to have a thickness of 20 nm. After that, a foundation layer comprising Cr:Tr=80:20 (by atomic ratio) was formed on the seed layer to have a thickness of 60 nm. Sequentially, a magnetic layer of which composition comprising CoPtCr alloy (Co:Pt:Cr=70:20:10 (by atomic ratio)): $SiO_2$=88:12 (by atomic ratio) was formed on the foundation layer to have a thickness of 25 nm.

The seed layers, the foundation layers, and the magnetic layers were also formed on both surfaces of the film. In the next place, the whole film is attached to a web-type CVD apparatus as shown in FIG. 4. By RF plasma CVD method using ethylene, nitrogen, argon as reaction gas, a nitrogen-containing diamond-like carbon protective layer comprising C:H:N=62:29:7 (by mol, ratio) was formed to have a thickness of 10 nm. During this, a bias voltage of −400V was applied to the magnetic layer. The protective layers were formed on both surfaces of the film.

Then, a solution with a perfluoropolyether lubricating agent having a hydroxyl group at molecular end (FOMBLIN Z-DOL manufactured by Audimont Inc.) dissolved in a fluorchemical solvent (HFE-7200 available from Sumitomo 3M Ltd.) was applied by gravure coating to form a lubricating layer of 1 nm in thickness.

A disk of 94 mm in diameter was formed by punching the obtained whole film. After tape polishing, the disk was accommodated in a flexible disk cartridge made of synthetic resin (cartridge for Zip-100 available from Fuji Photo Film Co., Ltd.). In this manner, a flexible diskwas manufactured.

The obtained flexible disk was evaluated according to an evaluating method as will be described below. The results are shown in Table 1.

Figure 5:
FIG. 5 is an electron micrograph for explaining an embodiment of the magnetic recording medium according to the present invention.

Further, the flexible disk was observed by a transmission electron microscope (H-7100FA available from Hitachi Ltd.) according to the thin-film section method. It was found from this observation that the ferromagnetic alloy has columnar structure. The photograph is shown in FIG. 5.

As for the thin-film section method, the composition of cobalt and silicon dioxide at the center of a columnar portion and a boundary between the columnar portion and a non-magnetic material were analyzed with an acceleration voltage 100 keV by a semiconductor detector (Si<Li> UTW-type) using a field emission scanning transmission electron microscope (HB501 available from Vacuum Generators) and an energy dispersive X-ray analyzer (KEVEX SIGMA Level 12). The abundance ratio (by atomic ratio) obtained from this analysis is shown in Table 2.

EXAMPLE 2

A disk-like sheet of 130 mm in diameter was formed by punching a whole film just after the formation of undercoat layers in Example 1. The disk-like sheet was fixed to a circular ring. Foundation layers and magnetic layers of which compositions were the same as those of Example 1 were formed on both surfaces of the sheet by using a batch-type sputtering apparatus. In addition, protective layers were further formed by a CVD apparatus. Lubricating layers which were the same as those in Example 1 were formed on the sheet by dip coating. Next, a disk of 94 mm in diameter was formed by punching the sheet. After tape polishing, the disk was accommodated in a flexible disk cartridge made of synthetic resin (cartridge for Zip-100 available from Fuji Photo Film Co., Ltd.). In this manner, a flexible disk was manufactured.

The obtained flexible disk was evaluated according to an evaluating method as will be described below. The results are shown in Table 1.

EXAMPLE 3

A Flexible disk was manufactured in the same manner as Example 1 except that the disk of this example had no seed layer of tantalum between the non-magnetic substrate and the foundation layer.

The obtained flexible disk was evaluated according to an evaluating method as will be described below. The results are shown in Table 1.

Figure 6:
FIG. 6 is an electron micrograph for explaining another embodiment of the magnetic recording medium according to the present invention.

The flexible disk was observed by the transmission electron microscope in the same manner as that for Example 1. It was found from this observation that the ferromagnetic alloy has columnar structure. The electron micrograph is shown in FIG. 6.

The composition of cobalt and silicon dioxide at the center and a boundary of a columnar portion were analyzed in the same manner as that for Example 1. The abundance ratio obtained from this analysis is shown in Table 2.

EXAMPLE 4

A hard disk was manufactured in the same manner as Example 1 except that a glass substrate of 94 mm in diameter which has been processed by mirror finish was used as the substrate. Moreover, no undercoat layer was formed and the obtained hard disk was not accommodated in a cartridge.

The obtained disk was evaluated according to an evaluating method as will be described below. The results are shown in Table 1.

COMPARATIVE EXAMPLE 1

A Flexible disk was manufactured in the same manner as Example 1 except that the composition of the magnetic layers was Cb:Pt:Cr=70:20:10 (by atomic ratio).

The obtained flexible disk was evaluated according to an evaluating method as will be described below. The results are shown in Table 1.

COMPARATIVE EXAMPLE 2

A Flexible disk was manufactured in the same manner as Example 1 except that the disk of this comparative example had no seed layers and no foundation layers.

The obtained flexible disk-was evaluated according to an evaluating method as will be described below. The results are shown in Table 1.

The composition of cobalt and silicon dioxide at the center and a boundary of a columnar portion were analyzed in the same manner as that for Example 1. The abundance ratio obtained from this analysis is shown in Table 2.

COMPARATIVE EXAMPLE 3

A Flexible disk was manufactured in the same manner as Example 1 except that the composition of the magnetic layers was (Co:Pt:Cr=70:20:10) :$SiO_2$ =60:40.

The obtained flexible disk was evaluated according to an evaluating method as will be described below. The results are shown in Table 1.

The composition of cobalt and silicon dioxide at the center and a boundary of a columnar portion were analyzed in the same manner as that for Example 1. The abundance ratio obtained from this analysis is shown in Table 2.

(Evaluation Method)

1. Magnetic Property

The coercive force Hc was measured by a vibrating sample magnetometer (VSM) and was evaluated as magnetic property.

2. Side-Runout

The flexible disks and the hard disk were rotated at 3000 rpm. In this state, the side-runout at a portion radially 35 mm apart from the rotational axis was measured by a laser displacement gauge.

3. C/N

The reproduction signal/noise (C/N) ratio was measured under the following condition. An MR head having a reproducing truck width of 2.2 µm and a reproducing gap length of 0.26 µm was used as a reproducing head. Recording and reproduction were conducted at a liner recording density of 130 kFCI. The rotating speed was 3000 rpm and the radius of the head was 35 mm. The weight of the head was 29.4 mN (3 gf)

4. Modulation

The reproduction output during the aforementioned C/N measurement was measured over a full circle of the disk and the minimum and maximum of the output were obtained. The ratio of the minimum relative to the maximum was represented by percentage.

5. Durability

Except for the hard disk, the flexible disks were run by a Zip drive unit (drive unit for Zip-100 available from Fuji Photo Film Co., Ltd.) to repeatedly record and reproduce information. At a time when the reproduction output was reduced by −3 dB than the initial value, the running was stopped. The running time was measured as durability time. Environmental condition for the test was 23° C. and 50% RH (relative humidity). The maximum time of test was 300 hours.

TABLE 1

| | Hc (kA/m) | Side-runout (µm) | C/N (dB) | Modulation (%) | Durability Time (h) |
|---|---|---|---|---|---|
| Example 1 | 247 | 30 | 0 | 94 | >300 |
| Example 2 | 239 | 30 | −0.6 | 92 | >300 |
| Example 3 | 230 | 25 | −1.6 | 95 | >300 |
| Example 4 | 231 | 10 | −2.6 | 98 | — |
| Comparative Example 1 | 143 | 30 | −9.8 | 90 | >300 |
| Comparative Example 2 | 191 | 32 | −6.0 | 90 | >300 |
| Comparative Example 3 | 127 | 30 | −10.6 | 92 | >300 |

TABLE 2

| | Center of Ferromagnetic alloy | | Boundary of Non-magnetic material | |
|---|---|---|---|---|
| | Cobalt | Silicon Dioxide | Cobalt | Silicon Dioxide |
| Example 1 | 63.0 | 11.6 | 35.1 | 30.0 |
| Example 3 | 61.4 | 11.3 | 41.8 | 26.0 |
| Comparative Example 2 | 54.2 | 19.8 | 51.0 | 20.4 |
| Comparative Example 3 | 36.0 | 44.4 | 31.0 | 48.7 |

As described the above, the flexible disks of the present invention are excellent both in recording property and durability. It is found that such improvements in recording layer properties are achieved by the columnar structure of magnetic substances in a magnetic layer of a flexible disk and formation of non-magnetic compound rich portions at boundaries of magnetic substances.

In Example 3 without forming seed layers made of tantalum, the C/N characteristic is lowered due to the decrease in orientation of crystallization. This can be apparent from the composition analysis. On the other hand, in Example 4 using a glass substrate as the substrate, the C/N characteristic is slightly lower than that of the flexible disk of Example 1 which was manufactured in the same manner except for the substrate. This is because the output is relatively lowered. This may be attributed to the fact that the lifting amount of the head on hard disk is higher than that on flexible disk. In Comparative Example 1 without using non-magnetic material ($SiO_2$) in the magnetic layer, the coercive force is lowered and the recording property is deteriorated. From the results of composition analysis, this is attributed to the fact that definite separation between magnetic substances and non-magnetic compound could not be carried out. In Comparative Example 2 without using foundation layers, some coercive force can be obtained, but the orientation of crystallization of the magnetic layer can not be sufficiently controlled and the C/N characteristic is lowered. In Comparative Example 3 having the increased rate of-non-magnetic compound in the magnetic layer, the coercive force and C/N are significantly lowered. This may be attributed to the fact that the magnetization in the magnetic layer is reduced and the magnetic substances exist in the granular state in the non-magnetic compound so that the orientation of crystallization of the magnetic layer can not be sufficiently controlled, thereby increasing the noise ratio and lowering the output.

The present invention enables the production at a room temperature of low-noise magnetic recording media which can be suitably used in a high-density magnetic recording device and has reduced interaction between ferromagnetic substances having columnar structure. Particularly, the present invention can provide a huge-capacity flexible disk.

We claim:

1. A magnetic recording medium comprising a magnetic layer, including a cobalt-containing ferromagnetic alloy and a non-magnetic material, on at least one surface of a non-magnetic substrate body, wherein the ferromagnetic alloy forms a columnar structure, and said non-magnetic substrate body is a flexible polymer body, the thickness of the flexible polymer body is from 10 μm to 200 μm, and the flexible polymer body comprises a synthetic resin selected from the group consisting of polyethylene naphthalate and polyethylene terephthalate.

2. A magnetic recording medium as claimed in claim 1, wherein the cobalt-containing ferromagnetic alloy is an alloy of cobalt and any of a group consisting of chrome, platinum, nickel, iron, boron, silicon, tantalum, and niobium.

3. A magnetic recording medium as claimed in claim 1, wherein the cobalt-containing ferromagnetic alloy is any of a group consisting of Co—Pt—Cr, Co—Pt—Cr—Ta, and Co—Pt—Cr—B.

4. A magnetic recording medium as claimed in claim 1, wherein the nonmagnetic material is at least one of oxides, nitrides, or carbides selected from a group consisting of Si, Zr, Ta, B, Ti, Al, Cr, Ba, Zn, Na, La, In, and Pb.

5. A magnetic recording medium as claimed in claim 1, wherein the nonmagnetic material is a silicon oxide.

6. A magnetic recording medium as claimed in claim 1, wherein the mixing ratio between the cobalt-containing ferromagnetic alloy and the non-magnetic material is in a range from 95:5 to 80:20(by atomic ratio) (Ferromagnetic alloy:Non-magnetic material).

7. A magnetic recording medium as claimed in claim 1, wherein the thickness of the magnetic layer made of a mixture of the cobalt-containing ferromagnetic alloy and the non-magnetic material is in a range from 10 nm to 60 nm.

8. A magnetic recording medium as claimed in claim 1, further comprising a foundation layer which contains at least one element selected from a group consisting of Li, Be, Mg, Al, Si, P, S, K, Ca, Sc, Ti, V, Mn, Fe, Co, Ni, Cu, Zn, Ga, Ge, As, Se, Rb, Sr, Y, Zr, Nb, Mo, Ru, Rh, Pd, Ag, In, Sn, Sb, Te, Cs, Ba, Hf, Ta, W, Re, Os, Ir, Pt, Au, Pb, and Bi.

9. A magnetic recording medium as claimed in claim 8, wherein the foundation layer is made by using a chrome-containing alloy containing at least one element selected from a group consisting of Co, Be, Os, Re, Ti, Zn, Ta, Al, Mo, W, V, Fe, Sb, Ir, Ru, Rh, Pt, Pd, Si, and Zr.

10. A magnetic recording medium as claimed in claim 8, wherein the thickness of the foundation layer is from 10 nm to 200 nm.

11. A magnetic recording medium as claimed in claim 1, wherein said body is formed by laminating a plurality of synthetic resin films.

12. A magnetic recording medium as claimed in claim 8, wherein a seed layer is provided between the foundation layer and the non-magnetic body.

13. A magnetic recording medium as claimed in claim 12, wherein a seed layer is made of at least one selected from a group consisting of Ta, Ta—Si, Ta—Al, Ta—C, Ta—W, Ta—Ti, Ta—N, Ta—Ni, Ta—O, Ta—P, Ni—P, Ni—Al, Ni—C, Ni—Ti, Ni—W, Ni—Si, Ni—N, Ni—O, Ti—W, Ti—C, Ti—N, Ti—Si, Ti—O, Ti—P, Al—Ti, Mg—O, Mg—W, Mg—C, Mg—N, Mg—Ti, Mg—Ni, Mg—Al, Mg—Si, Mg—P, Zn—Si, Zn—Al, Zn—C, Zn—W, Zn—Ti, Zn—N, Zn—Ni, Zn—O, and Zn—P.

14. A magnetic recording medium as claimed in claim 1, further comprising a protective layer on the magnetic layer, wherein the protective layer is made of at least one selected from a group consisting of silica, alumina, titania, zirconia, cobalt oxide, nickel oxide, titanium nitride, silicon nitride, boron nitride, silicon carbide, chromium carbide, boron carbide and carbon.

15. A magnetic recording medium as claimed in claim 14, wherein the protective layer is formed by laminating a hard carbon protective film and a nitride protective film.

16. A magnetic recording medium as claimed in claim 14, wherein a lubricating agent selected from a group of hydrocarbon based lubricating agent, fluorine based lubricating agent, and extreme-pressure additive is applied onto the protective layer.

17. A magnetic recording medium as claimed in claim 14, wherein a rust preventive agent is applied onto the protective layer.

18. A magnetic recording medium comprising a magnetic layer, including a cobalt-containing ferromagnetic alloy and a non-magnetic material, on at least one surface of a non-magnetic substrate body, wherein the ferromagnetic alloy forms a columnar structure, and said non-magnetic substrate body is a flexible polymer body, the thickness of the flexible polymer body is from 10 μm to 200 μm, and the flexible polymer body comprises a synthetic resin selected from the group consisting of polyethylene naphthalate and polyethylene terephthalate, wherein an undercoat layer is formed on the surface of the flexible polymer body and the protrusions are formed on the surface of the undercoat layer.

19. A magnetic recording medium as claimed in claim 18, wherein the undercoat layer comprises a material selected from the group consisting of polyimide resin, polyamide-imide resin, silicone resin, and fluorocarbon resin.

20. A magnetic recording medium as claimed in claim 18, wherein the height of the protrusions is from 5 nm to 60 nm.

21. A magnetic recording medium as claimed in claim 18, further comprising a protective layer on the magnetic layer, wherein the protective layer comprises at least one selected from the group consisting of silica, alumina, titania, zirconia, cobalt oxide, nickel oxide, titanium, nitride, silicon nitride, boron nitride, silicon carbide, chromium carbide, boron carbide and carbon.

22. A magnetic recording medium as claimed in claim 21, wherein the protective layer is formed by laminating a hard carbon protective film and a nitride protective film.

23. A magnetic recording medium as claimed in claim 21, wherein a lubricating agent selected from a group of hydrocarbon based lubricating agent, fluorine based lubricating agent, and extreme-pressure additive is applied onto the protective layer.

24. A magnetic recording medium as claimed in claim 21, wherein a rust preventive agent is appliedonto the protective layer.

25. A magnetic recording medium designed so as to be brought in contact with heads, comprising a magnetic layer, including a cobalt-containing ferromagnetic alloy and a non-magnetic material, on at least one surface of a non-magnetic substrate body, and the ferromagnetic alloy forms a columnar structure, and said non-magnetic substrate body is a flexible polymer body, the thickness of the flexible polymer body is from 10 $\mu$m to 200 $\mu$m, and the flexible polymer body comprises a synthetic resin selected from the group consisting of polyethylene naphthalate and polyethylene terephthalate, wherein an undercoat layer is formed on the surface of the flexible polymer body and the protrusions are formed on the surface of the undercoat layer.

26. A magnetic recording medium as claimed in claim 25, wherein the undercoat layer comprises a material selected from the group consisting of polyimide resin, polyamide-imide resin, silicone resin, and fluorocarbon resin.

27. A magnetic recording medium as claimed in claim 25, wherein the height of the protrusions is from 5 nm to 60 nm.

28. A magnetic recording medium as claimed in claim 25, further comprising a protective layer on the magnetic layer, wherein the protective layer comprises at least one selected from the group consisting of silica, alumina, titania, zirconia, cobalt oxide, nickel oxide, titanium nitride, silicon nitride, boron nitride, silicon carbide, chromium carbide, boron carbide and carbon.

29. A magnetic recording medium as claimed in claim 28, wherein the protective layer is formed by laminating a hard carbon protective film and a nitride protective film.

30. A magnetic recording medium as claimed in claim 28, wherein a lubricating agent selected from a group of hydrocarbon based lubricating agent, fluorine based lubricating agent, and extreme-pressure additive is applied onto the protective layer.

31. A magnetic recording medium as claimed in claim 29, wherein a rust preventive agent is applied onto the protective layer.

* * * * *